US012447095B2

(12) United States Patent
Berthet

(10) Patent No.: US 12,447,095 B2
(45) Date of Patent: Oct. 21, 2025

(54) PRESSURE APPLICATION GARMENT

(71) Applicant: NEURALTIDE, Paris (FR)

(72) Inventor: Karine Berthet, Paris (FR)

(73) Assignee: NEURALTIDE, Paris (FR)

( * ) Notice: Subject to any disclaimer, the term of this patent is extended or adjusted under 35 U.S.C. 154(b) by 826 days.

(21) Appl. No.: 17/778,167

(22) PCT Filed: Nov. 20, 2020

(86) PCT No.: PCT/EP2020/082797
§ 371 (c)(1),
(2) Date: May 19, 2022

(87) PCT Pub. No.: WO2021/099525
PCT Pub. Date: May 27, 2021

(65) Prior Publication Data

US 2023/0018250 A1 Jan. 19, 2023

(30) Foreign Application Priority Data

Nov. 22, 2019 (EP) .................................... 19306512

(51) Int. Cl.
*A61H 9/00* (2006.01)

(52) U.S. Cl.
CPC ..... *A61H 9/0092* (2013.01); *A61H 2201/165* (2013.01); *A61H 2201/5071* (2013.01); *A61H 2209/00* (2013.01); *A61H 2230/255* (2013.01)

(58) Field of Classification Search
CPC ................................ A61H 9/00; A61H 9/0092
See application file for complete search history.

(56) References Cited

U.S. PATENT DOCUMENTS

| | | | |
|---|---|---|---|
| 9,554,964 | B1 | 1/2017 | Johnson et al. |
| 2012/0078145 | A1 | 3/2012 | Malhi et al. |

FOREIGN PATENT DOCUMENTS

| | | | |
|---|---|---|---|
| CN | 102083332 | A | 6/2011 |
| CN | 102440895 | A | 5/2012 |
| CN | 107205644 | A | 9/2017 |
| EP | 1814500 | B1 | 6/2008 |
| EP | 2444041 | A1 | 4/2012 |
| WO | 2009072011 | A1 | 6/2009 |
| WO | 2009114899 | A1 | 9/2009 |
| WO | 2016069842 | A1 | 5/2016 |

OTHER PUBLICATIONS

International Search Report mailed Feb. 24, 2021, in corresponding to International Application No. PCT/EP2020/082797; 3 pages.
Written Opinion of the International Searching Authority mailed Feb. 24, 2021, in corresponding to International Application No. PCT/EP2020/082797; 5 pages.

*Primary Examiner* — LaToya M Louis
(74) *Attorney, Agent, or Firm* — Maier & Maier, PLLC

(57) ABSTRACT

A pressure application relating to a garment that includes at least one active part for applying pressure to at least one body part of a subject and the active part includes at least one bladder fillable with a fluid so as to obtain a homogeneous positive pressure applied to the whole of the corresponding at least one body part of the subject, the pressure application garment also including for the or each active part, at least one interface pressure sensor, a control unit, and a driving module wherein the pressure application garment further includes at least one sheet of a fabric made of at least three superimposed layers.

15 Claims, 6 Drawing Sheets

PRESSURE APPLICATION GARMENT

FIELD

The invention relates to a pressure application garment for applying pressure to at least one part of the body of a subject.

BACKGROUND

Compression systems are used in many fields such as aeronautical field, medical field, sports field, military field, and massage field. Compression systems often aim to ensure a homogeneous and constant pressure. For example, EP 1 814 500 B1 discloses a device that aims to accomplish improved pressure profiles; this device comprises a mechanism for adapting the pressure profile in response to a signal and for redistributing the basic pressure profiles between the various segments that exert pressure on a human body.

However, there is another objective that compression systems should have. Indeed, compression systems can lead to the formation of skin marks and/or skin folds, that can be caused for example by the folds of the compression system that appear when it tightens around the body and/or if the surface of the compression system is not smooth.

Therefore, the present invention aims to solve this problem by proposing a pressure application garment that avoids the formation of skin marks and/or skin folds while providing a homogenous positive pressure.

SUMMARY

This invention thus relates to a pressure application garment comprising at least one active part for applying pressure to at least one body part of a subject, comprising at least one bladder fillable with a fluid so as to obtain a homogeneous positive pressure applied to the whole of the corresponding at least one body part of the subject, said pressure application garment comprising:

- for the or each active part, at least one interface pressure sensor, and
- a control unit comprising a receiving module configured to receive the interface pressure measurements from the one or more interface pressure sensors of the or each active part, and a driving module configured to drive, based on the interface pressure measurements received by the receiving module for each active part, at least one injection device for injecting fluid into the one or more fillable bladders of the active part(s), so as to maintain a predefined interface pressure value for the or each active part, characterized in that said pressure application garment comprises in at least one area of at least one active part in contact with the body, at least one sheet of a fabric made of at least three superimposed layers: a lower layer that is closest to the body part, an upper layer and an intermediate layer, said intermediate layer being between the lower layer and the upper layer and having elasticity in the transverse direction, enabling at least the limitation of the deformation of the lower layer when the upper layer is deformed.

The fact that the intermediate layer displays some elasticity enables the limitation of the deformation of the lower layer, in direct contact with the subject's skin, and thus avoiding any markings of the skin, and improving the homogeneity of the applied pressure.

BRIEF DESCRIPTION OF THE DRAWINGS

Features and advantages of the invention will become apparent from the following description of embodiments of a pressure application garment and of a method for applying pressure according to the invention, provided merely by way of example and with reference to the appended drawings in which.

DETAILED DESCRIPTION

Figure 1:
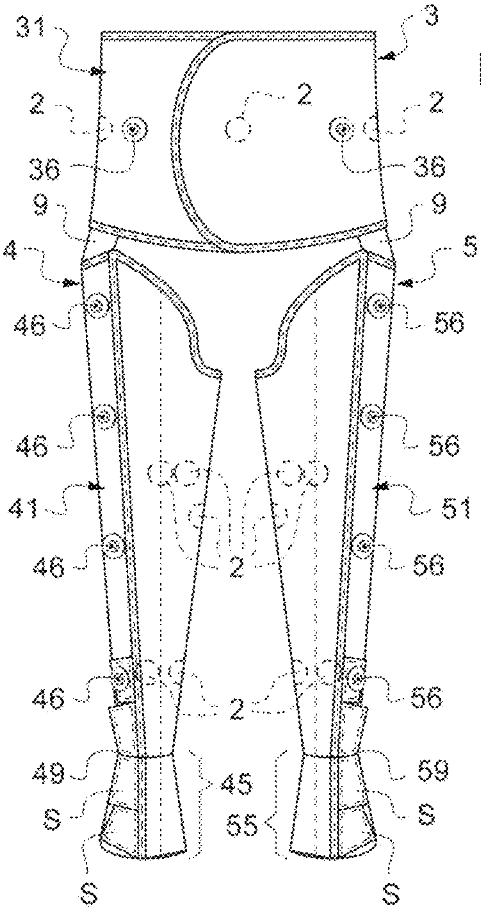
FIG. 1 is a front view of a pressure application garment according to a first embodiment of the invention.
Figure 2:
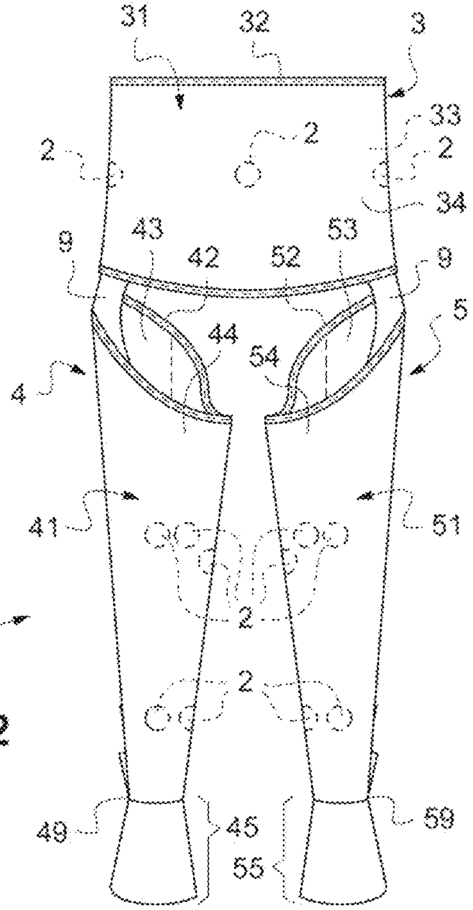
FIG. 2 is a rear view of the pressure application garment of FIG. 1.

In the present invention, the following terms have the following meanings:

- "Active part" refers to a part of the compression system that is able to apply positive pressure on the corresponding body part.
- "Bladder" refers to an inflated or hollow flexible bag or chamber.
- "Elastomeric yarns" refers to yarns comprising an elastomer, that is a polymer with viscoelasticity.
- "Elasticity" refers to the property of a material by virtue of which it tends to recover its original size and shape immediately after removal of the force causing deformation.
- "Mesh" refers to a monolayer or multilayer of cross-linked fibers. Said fibers can be warps and woofs and can be interlaced at right, acute and/or obtuse angles for example by weaving or knitting.
- "Part of the body of a subject" or "body part" refers to a part of a human person around which a compression system can be applied, such as, without being limiting: the abdomen; a lower limb or a part of a lower limb for example a leg, an ankle, a calf, a thigh, a foot; an upper limb or a part of an upper limb for example an arm, a forearm, a wrist, a hand.
- "Polyamide" refers to polymers made of repeating units linked by amide links.
- "Polyamide-6,6" or "nylon" or "nylon-6,6" or "PA-6,6" refers to a polymer obtained by polycondensation of hexamethylenediamine and adipic acid.
- "Skin impressions" or "skin marks" refers to pink or red patterns or other patterns on the skin such as a more or less large strip or a circle or an oval shape or any other form susceptible to appear on the skin when a pressure is applied on it or when said skin is pinched.

"Spacer fabric" refers to three-dimensional fabric that comprises two layers, e.g. an upper and a lower layer, that are interconnected by a spacer material.

"Spring" refers to a mechanical component or part that uses the elastic properties of certain materials to absorb mechanical energy, produce movement, or exert force or couple. Springs can be made of wires that are helically wound on themselves. The wires can be made of any suitable material, for example steel.

"Subject" refers to any person.

"Wall of an active part" refers to the inner or the outer walls of an active part. The inner wall comprises at least a flexible layer that delimits the bladder of the active part and that is impervious to the fluid that fills said bladder and a fabric made of at least three superimposed layers in at least one area; the inner wall can also comprise, on the flexible layer (i.e. between the flexible layer and the fabric made of at least three superimposed layers), a coating layer. The outer wall comprises at least a flexible layer that delimits the bladder of the active part and that is impervious to the fluid that fills said bladder; the outer wall can also comprise, on the flexible layer, a coating layer.

"Wire" refers to longitudinal means comprising a length sensibly higher than its thickness, its width or its diameter. In particular, wire can be a strand, a flexible rod or a yarn.

"Yarn material" refers to a material made of yarns. For example, said yarns can be wound on themselves in particular helically wound on themselves, or in the form of many yarns that are parallel from each other and that intertwine.

The following detailed description will be better understood when read in conjunction with the drawings. For the purpose of illustrating, the system is shown in the preferred embodiments. It should be understood, however, that the present invention is not limited to the precise arrangements, structures, features, embodiments, and aspect shown. The drawings are not drawn to scale and are not intended to limit the scope of the claims to the embodiments depicted. Accordingly, it should be understood that where features mentioned in the appended claims are followed by reference signs, such signs are included solely for the purpose of enhancing the intelligibility of the claims and are in no way limiting on the scope of the claims.

According to a one aspect, this invention relates to a pressure application garment comprising at least one active part for applying pressure to at least one body part of a subject, comprising at least one bladder fillable with a fluid so as to obtain a homogeneous positive pressure applied to the whole of the corresponding at least one body part of the subject, said pressure application garment comprising:

for the or each active part, at least one interface pressure sensor, and a control unit comprising a receiving module configured to receive the interface pressure measurements from the one or more interface pressure sensors of the or each active part, and a driving module configured to drive, based on the interface pressure measurements received by the receiving module for each active part, at least one injection device for injecting fluid into the one or more fillable bladders of the active part(s), so as to maintain a predefined interface pressure value for the or each active part, characterized in that said pressure application garment comprises in at least one area of at least one active part in contact with the body, at least one sheet of a fabric made of at least three superimposed layers: a lower layer that is closest to the body part, an upper layer and an intermediate layer, said intermediate layer being between the lower layer and the upper layer and having elasticity in the transverse direction, enabling at least the limitation of the deformation of the lower layer when the upper layer is deformed.

The fact that the intermediate layer displays some elasticity enables the limitation of the deformation of the lower layer, in direct contact with the subject's skin, and thus avoiding any markings of the skin, and improving the homogeneity of the applied pressure.

According to one embodiment, said intermediate layer of said fabric made of at least three superimposed layers has elasticity also in the longitudinal direction and/or in the lateral direction.

According to one feature, the elasticity of the intermediate layer of the fabric made of at least three superimposed layers enables the limitation up to the elimination of the deformation of the lower layer when the upper layer is deformed.

In one embodiment, the at least one interface pressure sensor is configured to measure a pressure at the interface between the active part and the corresponding body part of the subject while being positioned between the active part and the corresponding body part of the subject. The interface pressure taken into account by the control unit for each active part, which is measured by means of at least one interface pressure sensor positioned between the active part and the corresponding body part of the subject, is representative of the pressure actually applied by the active part to the corresponding body part of the subject, which allows an automatic, reliable and accurate application of pressure by means of the pressure application garment according to the invention. On the contrary, if the pressure taken into account by the control unit for each active part is only the filling pressure of each bladder of an active part, in particular measured using a pressure gauge installed in a connection pipe between the bladder and an injection device for injecting fluid into the bladder, the control of the applied pressure is not reliable because the filling pressure of a bladder is not systematically representative of the pressure actually applied by the bladder on the corresponding body part of the subject, which depends on the degree of adjustment of the garment around the body of the subject.

According to one embodiment, for each fillable bladder, the volume for receiving fluid is delimited by a layer that is impervious to said fluid, in particular having a textile and/or plastic material base. According to one feature, the textile and/or plastic material that delimits the volume for receiving fluid for each fillable bladder is flexible.

Preferably, the material of the impervious layer has also elasticity properties that can be obtained, for example, by incorporating elastane into the material of the layer or, in the case of a layer comprising a woven textile, by way of weaving the textile. Advantageously, the material of the impervious layer is selected such that it can be washed, on the outer surface thereof, i.e. the outwards-facing surface of the bladder. According to one embodiment, the layer that is impervious to the fluid that fills the bladder comprises a first portion and a second portion superimposed on one another, which define therebetween the volume for receiving the fluid of each fillable bladder. In the adjusted configuration of the active part on the corresponding body part of the subject, the first portion is directed inwards, whereas the second portion is directed outwards. The first and second portions are advantageously connected to one another by a peripheral seam that is impervious to said fluid, or by any other peripheral connection means that is impervious to said fluid.

In one feature, the layer that is impervious to the fluid that fills the bladder is coated with a coating layer, particular a coating layer having a polyurethane, silicone, polyvinyl chloride (PVC) or other plastic material base.

In one embodiment, the fluid filling each bladder is air, whereby the flexible layer delimiting the volume of each bladder is thus airtight in a given pressure range, compatible with the air pressures that will be imposed in the bladder in order to exert the positive pressure required on the body of the subject. Such an airtight layer can in particular be a layer of plastic material, either self-supporting or deposited on a substrate. In particular, the airtight layer can comprise the superimposition of a woven or non-woven textile layer, in particular having a nylon, polypropylene, polyester, polyamide or cotton base, and a coating layer, in particular having a polyurethane, silicone, polyvinyl chloride (PVC) or other plastic material base. Preferably, the weight per unit area of the textile layer lies in the range 150 to 250 g/m$^2$. One example of a material that can be used to form the airtight layer within the scope of the invention comprises a knitted nylon layer, one side whereof is coated with a polyurethane coating layer. Thanks to the airtightness of the flexible layer forming each of the bladders, no air chamber is necessary, since the bladder itself acts as an air chamber. This results in a flexible structure of each fillable bladder, which improves the wearing comfort of the pressure application garment and facilitates the placement thereof on a subject, including on a bedridden or paralysed subject.

According to one embodiment, at least some areas of at least one active part(s) intended to be facing the body part of the subject are coated with said at least one sheet of a fabric made of at least three superimposed layers. Advantageously, the at least one sheet of said fabric coats all the surfaces of the active parts intended to be facing the body part of the subject. This fabric conforms to the shape of the body and minimizes friction and shearing forces.

Moreover, the fabric made of at least three superimposed layers, for example the 3D spacer fabric, has the ability on the one hand, to eliminate moisture and dissipate heat, and on the other hand, to redistribute or spread pressure over a much larger area of the product. Thus, the fabric made of at least three superimposed layers, for example the 3D spacer fabric, allows to avoid humidity and local pressure and to maintain a smooth surface on the skin, avoiding the coating layer of the airtight layer to clamp the skin that is direct in contact with said coating layer, thanks to the fabric according to the present invention that limits or even eliminates the deformation of the lower layer of the fabric according to the present invention when its upper layer is deformed by the pressure applied by the active part. This avoids the formation of marks on the skin throughout the duration of a pressure application session.

According to one embodiment, the intermediate layer of said fabric made of at least three superimposed layers comprises elastic means, preferably said elastic means are in the form of a layer of springs and/or in the form of a mesh and/or in the form of a yarn material.

According to one feature, the intermediate layer of said fabric made of at least three superimposed layers is in the form of a yarn material, said yarn material being in the form of yarns that are parallel to each other, that intertwine and that are perpendicular to the upper and lower layers.

According to another feature, the intermediate layer of said fabric made of at least three superimposed layers is in the form of a yarn material, said yarn material being in the form of yarns that are wound on themselves parallel to the upper and lower layers.

Preferably, said yarns are helically wound on themselves parallel to the upper and lower layers. According to another feature, said yarns are wound on themselves perpendicularly to the upper and lower layers.

According to another feature, the intermediate layer of said fabric made of at least three superimposed layers is in the form of a yarn material, said yarn material being in the form of loop stitches.

In one embodiment, the fabric made of at least three superimposed layers is a spacer fabric. According to the present invention, the term "spacer fabrics" refers to three-dimensional spacer fabrics (3D spacer fabrics). A sheet of 3D spacer fabric comprises two layers, e.g. an upper and a lower layer, that are interconnected by a spacer material, for example in the form of a yarn material. Typically, 3D spacer fabrics are a knitted or woven fabric, such as warp-knitted spacer fabrics or weft-knitted spacer fabrics. The 3D spacer fabrics can also be a non-woven spacer fabric. Warp-knitted spacer fabric can be manufactured using a double needle bar raschel machine and weft-knitted spacer fabrics can be produced using a double-jersey circular machine that has a rotatable needle cylinder and needle dial.

Without limitation, the upper and lower layers of the fabric made of at least three superimposed layers can be made of natural or synthetic material, for example polyamide, polyester, polypropylene, cotton, wool, a combination thereof or any other suitable material. Preferably, the upper and lower layers of the spacer fabric are made of polyamide. The use of polyamide in the upper and lower layers, for example textured polyamide, allows comfort for the skin on which the spacer fabric is applied.

In one feature, the intermediate layer comprises yarn material. Without limitation, the yarn material can comprise natural and/or synthetic yarns, such as polyester, polypropylene, polyethylene, polyurethane, polyamide, polylactic acid, corn starch-based yarns. The yarns can be monofilament, multi-filaments or textured yarns. Preferably, the yarn material comprises polyamide-6,6 fibres.

Advantageously, said yarn material further comprises metal ions such as silver ions or copper ions. Said metal ions can have been inserted in the yarn material during the spinning process. In one embodiment, the yarn material comprises polyamide-6,6 fibres that comprise metal ions such as silver ions, preferably the silver ions have been inserted during the spinning process. The presence of metal ions such as silver ions or copper ions in the spacer fabric contributes to the limitation of bacterial growth and thus to the prevention of body odor, improving the subject comfort.

In one embodiment, said intermediate layer of said fabric made of at least three superimposed layers comprises yarn material, said yarn material comprising polyamide-6,6 fibres, preferably said polyamide-6,6 fibres comprise silver ions.

In one embodiment, the intermediate layer further comprises elastomeric yarns, for example polyester-polyurethane copolymer or neoprene, preferably polyester-polyurethane copolymer. For example, the spacer fabric according to the present invention can also include yarns made of the copolymer that is marketed under the trade-mark Lycra®. The presence of elastomeric yarns such as Lycra®-based yarns contributes to the elasticity of the spacer fabric.

According to a more preferred embodiment, the spacer fabric according to the present invention comprises two layers comprising polyamide that are separated by a yarn material comprising first polyamide-6,6 fibres, preferably in which silver ions are inserted during the spinning process, and second, elastomeric yarns, that can be polyester-polyurethane copolymer, for example those marketed under the trade-mark Lycra®.

According to one embodiment, the intermediate layer of said fabric made of at least three superimposed layers comprises elastic means that are in the form of a layer of springs. Preferably, said springs are made of metal such as steel and/or of polymer such as polyester, polypropylene, polyethylene, polyurethane, polyamide, polylactic acid.

According to one embodiment, the intermediate layer of said fabric made of at least three superimposed layers comprises elastic means that are in the form of a mesh. Preferably, said mesh is made of a material chosen among natural and/or synthetic material, such as polyester, polypropylene, polyethylene, polyurethane, polyamide, polylactic acid, corn starch-based material.

According to one embodiment, the fabric made of at least three superimposed layers according to the present invention has a thickness between 0.5 mm and 25 mm, preferably between 1 mm and 10 mm, more preferably between 2 mm and 5 mm, even more preferably said thickness is 3.5 mm.

According to one embodiment, the upper layer of the fabric made of at least three superimposed layers according to the present invention has a thickness between 0.1 mm and 5 mm, preferably said thickness is between 0.5 and 3 mm, more preferably said thickness is between 1 and 3 mm.

According to one embodiment, the lower layer of the fabric made of at least three superimposed layers according to the present invention has a thickness between 0.1 mm and 5 mm, preferably said thickness is between 0.5 and 3 mm, more preferably said thickness is between 1 and 3 mm.

Advantageously, the weight of the fabric made of at least three superimposed layers according to the present invention is between 200 $g/m^2$ and 600 $g/m^2$, preferably between 300 $g/m^2$ and 500 $g/m^2$, more preferably between 400 $g/m^2$ and 450 $g/m^2$, even more preferably said weight is 420 $g/m^2$.

According to a feature, the compression resistance of the fabric made of at least three superimposed layers according to the present invention is in the range between 1 and 30 kPa, preferably between 1 and 6 kPa. Compression resistance can be measured using a compression machine. For example, MTS 810 material test system can be used, with a constant deformation rate of 2 mm/minute.

According to one embodiment, the vapour transfer rate of the spacer fabric according to the present invention is greater than 1000 $g/m^2/24$ h according to ASTM E96, preferably greater than 10000 $g/m^2/24$ h, ideally above 20000 $g/m^2/24$ h and in the best case above 30000 $g/m^2/24$ h.

According to one embodiment, the fabric made of at least three superimposed layers according to the present invention has a thickness between 0.5 mm and 25 mm, and/or a weight between 200 $g/m^2$ and 600 $g/m^2$, and/or a compression resistance in the range between 2 and 30 kPa and/or a vapour transfer rate greater than 1000 $g/m^2/24$ h according to ASTM E96 and/or a weight between 200 $g/m^2$ and 600 $g/m^2$, and/or a compression resistance in the range between 1 and 30 kPa and/or a vapour transfer rate greater than 1000 $g/m^2/24$ h according to ASTM E96.

According to one embodiment, two sheets of fabric made of at least three superimposed layers are superimposed. According to another embodiment, three sheets of fabric made of at least three superimposed layers are superimposed. The various sheets can be connected together by stitching and/or adhesive.

Preferably, the flexible layer that delimits the fluid received by each fillable bladder or its coating layer is merged with the upper layer of the fabric made of at least three superimposed layers.

Preferably, each active part of the pressure application garment comprises a single fillable bladder in order to simplify the design of the garment. For each active part, the number and arrangement of the interface pressure sensors are suitable for providing pressure measurements representative of the pressure effectively applied to the body part of the subject, while in particular avoiding the positioning of sensors on bony parts.

The size, and more particularly the measurement surface area, of each interface pressure sensor can differ from one sensor to another, in particular as a function of the location thereof. Thus, by way of example, if the pressure application garment comprises an active part that faces the abdomen, the anterior central sensor of the abdominal active part of the garment can be chosen to have a measurement surface area that is greater than the measurement surface area of the lateral sensors of the abdominal active part of the garment.

According to one advantageous feature, each interface pressure sensor is rigidly secured to the inner wall of the active part, i.e. the wall that is intended to be directed towards the corresponding body part of the subject. In particular, the interface pressure sensor can be housed in a compartment provided for this purpose on the inner wall of the active part. Alternatively, the interface pressure sensor can be rigidly secured to the inner wall of the active part by any other appropriate means, in particular by sewing or bonding, etc. The interface pressure sensors are positioned in such a way that they do not create skin marks or skin folds, according any suitable method known to the skilled person.

Advantageously, each interface pressure sensor is a pneumatic sensor connected in a sealed manner, in particular by means of a flexible tube, to a measurement module.

The use of such a pneumatic sensor has the advantage of limiting the electronics that must be directly embedded in the active parts of the pressure application garment. In particular, the pneumatic sensor can be a sensor as disclosed in patent document WO2009072011A1, comprising a cushion having a flexible polymer casing, for example made of silicone, capable of receiving, in the inner volume thereof, a predetermined volume of injected air corresponding to a known positive pressure. The measurement module comprises a pressure gauge and an air injection piston, which are in fluid communication with one another and with the pneumatic sensor. The measurement module of each sensor is configured to transmit the interface pressure measurements to the receiving module of the control unit. This transmission of data can be carried out by any means, in particular by wired connection means or by wireless means such as Bluetooth or WiFi. Advantageously, the measurement module of each pressure sensor is integrated into a housing of the control unit.

Alternatively, each interface pressure sensor can be an electronic sensor, in particular a sensor that measures a force applied to a surface at the interface between the active part and the corresponding body part of the subject, from which an interface pressure is calculated. Each electronic sensor is configured to transmit the interface pressure values to the receiving module of the control unit. This transmission of data is preferably carried out by wireless connection means such as Bluetooth or WiFi.

Advantageously, each fillable bladder of the pressure application garment comprises at least one filling end piece designed to be connected to a fluid injection device. For each fillable bladder, the pressure application garment is further provided with at least one filling pressure sensor for sensing the pressure to which the bladder is filled with fluid, such as a pressure gauge. In particular, for each fillable bladder, said filling pressure sensor can be installed in a connection pipe between a filling end piece of the bladder and the corresponding fluid injection device. Advantageously, the pressure application garment comprises automatic servo-control means between the one or more filling pressure sensors and the one or more interface pressure sensors of each active part. In particular, the one or more filling pressure sensors of each active part can be connected to the control unit such that an automatic servo-control system can be set up between the filling pressure sensors and the interface pressure sensors of each active part in order to obtain a constant, controlled pressure applied to each body part of the subject throughout the duration of a pressure application session. This allows homogeneous and constant pressure levels to be applied in an automatic, reliable and precise manner, to body parts of a subject, which is one of the advantages of the pressure application garment according to the present invention.

Within the scope of the invention, the injection device for injecting fluid into the one or more fillable bladders of each active part of the pressure application garment can be a pump, or a compressed air supply system such as those available in hospitals. In one advantageous embodiment, the injection device for injecting fluid into the one or more fillable bladders of each active part of the pressure application garment is a portable device, which allows the pressure application garment to be used during the transport of a subject. In one embodiment, the injection device for injecting fluid into the one or more fillable bladders of each active part of the pressure application garment is a portable pump incorporated into the garment.

Advantageously, each active part of the pressure application garment according to the present invention is a flexible part that can pass between a deployed configuration, allowing the placement thereof around the corresponding body part of the subject, and an adjusted configuration wherein it is adjusted around the corresponding body part of the subject. In the adjusted configuration, the active part has a tubular shape and the inwards-facing wall is capable of applying a positive pressure to the body part of the subject.

According to one embodiment, each active part comprises adjustment means for adjusting the active part around the corresponding body part of the subject, so as to take on, as best as possible, the shape of the corresponding body part of the subject and obtain the most effective and most homogeneous application of pressure possible to the corresponding body part of the subject.

According to one feature, for each active part, the adjustment means comprise patterning elements of the active part, capable of applying the active part against the corresponding body part of the subject when filling the or each fillable bladder of the active part.

The patterning elements of each active part allow the active part to be patterned in the filled state such that it is pressed against the corresponding body part of the subject and applies thereto a controlled and predictable surface pressure. This thus prevents any "buoy" effect when filling each active part, whereby the active part inflates without applying a controlled and uniform pressure to the body part of the subject.

In the case where each active part of the pressure application garment comprises a single fillable bladder, the presence of the patterning elements of each active part is even more important, in order to take on the shape of the corresponding body part of the subject upon filling of the fillable bladder of the active part, and to obtain a homogeneous application of pressure, in particular for the lower active parts which have a large filling volume.

According to one feature, for each active part of the pressure application garment, the patterning elements comprise at least one sculptural line of the layer delimiting the fluid-receiving volume of each fillable bladder of the active part, in particular a seam, which requires the shaping of the active part in the filled state in order to take on the shape of the corresponding body part of the subject. As a whole, the patterning elements comprise raised patterns of the active part, capable of applying, or pressing, the active part against the corresponding body part of the subject when filling the or each fillable bladder of the active part. The raised patterns can be sculptural seams or thermofusing of the textile-based and/or plastic material-based flexible layer forming the one or more bladders of the active part.

The adjustment means are designed for adjusting each active part of the pressure application garment around the corresponding body part of the subject, in order to take on, as best as possible, the shape of the corresponding body part of the subject and obtain the most effective and most homogeneous application of pressure possible. In the adjusted configuration, the active part generally has a tubular shape.

According to one feature, the adjustment means comprise closing elements of the active part, allowing for the adjustment of the circumference of the active part around the corresponding body part of the subject, preferably in an adapted manner throughout the length of the tubular active part. According to one specific embodiment, the closing elements comprise at least one pair of gripping strips, comprising a first strip provided with hooks and a second strip provided with loops, which extend over the length of the active part. Alternatively, or in conjunction therewith, the closing elements can comprise a plurality of tightening strap and clip systems distributed over the length of the active part.

In one embodiment, each active part comprises adjustment means for adjusting the active part around the corresponding body part of the subject, the adjustment means comprising closing elements of the active part, allowing for the adjustment of the circumference of the active part around the corresponding body part of the subject.

According to one embodiment, at least one of the lower active parts of the pressure application garment comprises an inner tightening element which, when the lower active part is in place around the lower limb of the subject, is capable of surrounding the thigh of the subject and of applying a tightening force thereto. The inner tightening element can thus act as a tourniquet, procuring vein occlusion at the thigh of the subject. Preferably, the inner tightening element is a cuff intended to be inflated to a standardised pressure (50 mmHg). The application of a vein occlusion at the thigh of the subject using the inner tightening element is advantageously combined with a measurement of the variations in the volume of the lower limb as a result of this occlusion and the release thereof, in order to assess the mobilisable blood volume (or "venous bed").

According to one advantageous feature, the pressure application garment comprises a protective textile, capable of being replaced upon each use of the garment, which is secured in a removable manner to the inner wall of one or of each active part of the garment, i.e. the wall of the active part that is facing inwards in the configuration in which the active part is adjusted around the corresponding body part of the subject. The protective textile prevents fouling of the active part. Preferably, the protective textile is arranged on the inner wall of each active part, while being tensioned, and is held tensioned by any appropriate means, such as gripping strips or other means. More specifically, it is important to avoid any folds in the protective textile within the scope of a pressure application session. Examples of textiles suitable for use as the protective textile are microfibre textiles having a weight per unit area that lies in the range 40 to 170 g/m$^2$.

According to aspect of the present invention, the pressure application garment according to the invention comprises at least three active parts which are one abdominal active part intended to surround the subject's abdomen and two lower active parts each intended to surround one of the subject's lower limbs, each of the active parts comprising at least one bladder fillable with a fluid so as to obtain a homogeneous positive pressure applied by the active part to the whole of the corresponding body part of the subject among the abdomen and the lower limbs.

Thus, the invention relates to a pressure application garment for applying pressure to the body of a subject, comprising three active parts which are one abdominal active part intended to surround the subject's abdomen and two lower active parts each intended to surround one of the subject's lower limbs, each of the active parts comprising at least one bladder fillable with a fluid so as to obtain a homogeneous positive pressure applied by the active part to the whole of the corresponding body part of the subject among the abdomen and the lower limbs, the pressure application garment comprising:

- for each active part, at least one interface pressure sensor configured to measure a pressure at the interface between the active part and the corresponding body part of the subject while being positioned between the active part and the corresponding body part of the subject,
- a control unit comprising a receiving module configured to receive the interface pressure measurements from the one or more interface pressure sensors of each active part, and a driving module configured to drive, based on the interface pressure measurements received by the receiving module for each active part, at least one injection device for injecting fluid into the one or more fillable bladders of the active part, so as to maintain a predefined interface pressure value for each active part, the predefined interface pressure value for the abdominal active part being strictly less than the predefined interface pressure value for each lower active part, characterized in that said pressure application garment comprises in at least one area of the inner wall of at least one active part in contact with the body, at least one sheet of a fabric made of at least three superimposed layers: a lower layer that is closest to the body part, an upper layer and an intermediate layer, said intermediate layer being between the lower layer and the upper layer and having elasticity in the transverse direction, enabling at least the limitation of the deformation of the lower layer when the upper layer is deformed.

According to one embodiment, said fabric made of at least three superimposed layers is the fabric made of at least three superimposed layers according to the present invention as described above. Advantageously, the active parts, the interface pressure sensors and the control unit are the active parts, the interface pressure sensors and the control unit according to the present invention as described above. Preferably, said pressure application garment comprises a protective textile and adjustment means as described above. All the optionally features described above for the pressure application according to the present invention are optionally features for said pressure application garment comprising three active parts.

In one embodiment, the control unit is configured to maintain:

- for the abdominal active part, a first predefined interface pressure value that lies in the range 10 to 20 mmHg; and
- for each of the two lower active parts, a second predefined interface pressure value that lies in the range 20 to 40 mmHg, the predefined interface pressure value for the abdominal active part being strictly less than the predefined interface pressure value for each lower active part.

According to one feature, the lower active parts of the pressure application garment are connected to the abdominal active part so as to facilitate the placement of the garment on the body of the subject. According to one feature of the invention, each lower active part comprises, at the end thereof opposite the abdominal active part, a plurality of segments capable of being folded back on top of one another in order to adapt the length of the lower active part to the length of the corresponding lower limb of the subject. Similarly, the abdominal active part can comprise, at one end, a plurality of segments capable of being folded back on top of one another in order to adapt the length of the abdominal active part to the length of the abdomen of the subject. Preferably, for each active part, in the state wherein the segments are folded back on top of one another, the portion of the fillable bladder corresponding to the folded segments is not filled with fluid. In order to further increase the adaptability of the pressure application garment to the morphology of each subject, the presence of segments that can be folded or rolled up, can be combined with the provision of different garment sizes, for example S, M, L, XL.

The part covering the subject's buttocks can be a fillable part, capable of being filled with air, and in particular can correspond to a fillable bladder, insofar as it can be useful to also apply a constant and controlled pressure to the subject's buttocks in order to expel blood from this area. Alternatively, the part covering the subject's buttocks can be non-fillable. Advantageously, the at least one sheet of a fabric made of at least three superimposed layers according to the present invention does not coat the surface that is intended to be facing the buttocks of the subject, which is coated with flexible jersey.

In one specific embodiment:

- the abdominal active part of the pressure application garment comprises three interface pressure sensors, comprising an anterior central sensor intended to be positioned in front of the centre of the abdomen, and two lateral sensors intended to be positioned on the sides of the abdomen;
- each lower active part of the pressure application garment comprises three to five interface pressure sensors, comprising one or two lower sensors intended to be positioned on the calf, in particular a posterior lower sensor on the posterior face of the calf and possibly a medial lower sensor on the medial face of the calf, and two or three upper sensors intended to be positioned on the thigh, in particular a posterior upper sensor on the posterior face of the thigh, a medial upper sensor on the medial face of the thigh and possibly an anteromedial upper sensor on the anteromedial face of the thigh.

According to one aspect of the present invention, the process for manufacturing the pressure application garment comprises a step of applying high frequencies, allowing the upper layer of the fabric made of at least three superimposed layers to melt and merge with the layer that is on the side closest to the body among the flexible layer that is impervious to the fluid that fills the bladder of the inner wall of the active part and its coating layer. The advantages of this method are that it is an easy method to make the fabric made of at least three superimposed layers adhere to the bladder, and at the same time this method promotes the imperviousness of the seams.

Thus, the invention also relates to the pressure application garment as described in the present description, characterized in that it is obtained by a process comprising a step of applying high frequencies, allowing the fabric made of at least three superimposed layers to melt and merge with the layer that is on the side closest to the body among the flexible layer of the inner wall of the active part and its coating layer.

According to a configuration of the control unit, the pressure application garment according to the invention is configured to automatically apply pressure to the body of a subject in line with the "Lower Body Positive Pressure" (LBPP) principle, creating a pressure gradient between the abdomen on the one hand and the lower limbs on the other hand, in order to enable revascularisation of the brain by mobilisation of the blood contained in the lower body of the subject.

Therefore, according to one feature, the control unit is configured to maintain:

- for the abdominal active part, a first predefined interface pressure value that lies in the range 10 to 20 mmHg, preferably equal to about 10 mmHg; and
- for each of the two lower active parts, a second predefined interface pressure value that lies in the range 20 to 40 mmHg, preferably equal to about 20 mmHg, the first predefined interface pressure value for the abdominal active part being strictly less than the second predefined interface pressure value for each lower active part.

Control using the interface pressure sensors further guarantees that the pressures applied remain constant on each body part of the subject throughout the duration of a pressure application session, which in particular lasts about 90 minutes in the case of LBPP.

According to this feature, the pressure application garment according to the invention allows the brain to be revascularized in a passive manner by increasing the circulating plasma volume. The control unit allows the interface pressure to be automatically controlled and the injection of fluid into the one or more bladders of each active part to be servo-controlled as a function of the interface pressure measurements and the interface pressure setpoint, which guarantees the application of a constant pressure throughout the duration of a session, without manual intervention.

It should be noted that the therapeutic pass-band for application of the LBPP regime must lie in the range 20 to 40 mmHg on the lower limbs, without exceeding 40 mmHg. Under these conditions, the pressure application garment according to the invention is configured to maintain a second predefined interface pressure value of less than or equal to 40 mmHg for each of the two lower active parts.

Advantageously, the control unit is configured to receive measurements representative of the subject's blood pressure, in particular taken continuously during the treatment session, and to control the or each injection device for injecting fluid into the one or more fillable bladders of the lower active parts, so as to keep the subject's blood pressure values below predefined thresholds, in particular so as to keep the systolic blood pressure (SBP) strictly below 220 and the diastolic blood pressure (DBP) strictly below 120.

In one embodiment, the control unit is configured to receive measurements representative of the intracerebral blood flow of the subject, in particular obtained by transcranial Doppler, and to correlate the change in the measurements representative of the intracerebral blood flow with the pressure gradient applied to the body parts of the subject by means of the pressure application garment.

This configuration advantageously allows a practitioner to select a therapeutic goal, for example to aim for an average increase of 30% in intracerebral blood flow compared to that at the start of the treatment session.

According to one feature, the lower active parts of the pressure application garment are connected to the abdominal active part so as to facilitate the placement of the garment on the body of the subject. According to one feature of the invention, each lower active part comprises, at the end thereof opposite the abdominal active part, a plurality of segments capable of being folded back on top of one another in order to adapt the length of the lower active part to the length of the corresponding lower limb of the subject.

The present invention also relates to a method for placing a pressure application garment according to any one of the preceding claims on a subject, said method comprising steps in which:

- each active part of the pressure application garment in the deployed configuration is positioned facing the corresponding body part of the subject;
- each active part of the pressure application garment in the deployed configuration is placed into an adjusted configuration in which it is adjusted around the corresponding body part of the subject;
- each fillable bladder of the pressure application garment is filled with fluid until a measurement is obtained, for each active part, from each interface pressure sensor of the active part that is substantially equal to a predefined interface pressure value for said active part.

The present invention further relates to a method for applying pressure to the body of a subject according to a predetermined protocol, including a first predefined pressure value to be applied to the subject's abdomen and a second predefined pressure value to be applied to each of the subject's lower limbs for a predefined duration, using a pressure application garment comprising three active parts, which are one abdominal active part intended to surround the subject's abdomen and two lower active parts each intended to surround one of the subject's lower limbs, each of the active parts comprising at least one bladder fillable with a fluid so as to obtain a homogeneous positive pressure applied by the active part to the whole of the corresponding body part of the subject among the abdomen and the lower limbs, the pressure application garment comprising, for each active part, at least one interface pressure sensor configured to measure a pressure at the interface between the active part and the corresponding body part of the subject, while being positioned between the active part and the corresponding body part of the subject, said method comprising steps in which:

- each active part of the pressure application garment in the deployed configuration is positioned facing the corresponding body part of the subject;

each active part of the pressure application garment in the deployed configuration is placed into an adjusted configuration in which it is adjusted around the corresponding body part of the subject;

each fillable bladder of the pressure application garment is filled with fluid until a measurement is obtained, for each active part, from each interface pressure sensor of the active part that is substantially equal to the predefined pressure value to be applied to the body part of the subject that corresponds to said active part;

during the predefined duration, for each active part, the interface pressure measurements received for each active part are used as a basis to drive at least one injection device for injecting fluid into the one or more fillable bladders of the active part, so as to maintain a measurement from each interface pressure sensor of the active part that is substantially equal to the predefined pressure value to be applied to the body part of the subject that corresponds to said active part.

According to one embodiment of the method for applying pressure, the or each fluid injection device is driven automatically using a control unit.

The present invention also relates to a fabric made of at least three superimposed layers, the intermediate layer comprising elastic means such as a layer of springs and/or in the form of a mesh and/or in the form of a yarn material.

In one embodiment, said fabric made of at least three superimposed layers is a spacer fabric, as defined above.

Without limitation, said spacer fabric of the present invention can comprise natural and/or synthetic yarns, such as polyester, polypropylene, polyamide, polylactic acid, corn starch-based yarns. The yarns can be mono-filament, multi-filaments or textured yarns.

Without limitation, the upper and lower layers can be made of natural or synthetic material, for example polyamide, polyester, polypropylene, cotton, wool, or any other suitable material.

Preferably, the spacer fabric according to the present invention comprises two layers comprising polyamide that are separated by a spacer material, for example in the form of a yarn material. The use of polyamide in the upper and lower layers, for example textured polyamide, allows comfort for the skin on which the spacer fabric is applied.

Advantageously, the spacer fabric according to the present invention comprises two layers comprising polyamide that are separated by a yarn material comprising first polyamide-6,6 fibre, preferably in which silver ions are inserted during the spinning process, and second, elastomeric yarns, that can be polyester-polyurethane copolymer, for example those marketed under the trade-mark Lycra®.

According to an embodiment, the spacer fabric according to the present invention has a thickness between 0.5 mm and 25 mm, preferably between 0.5 mm and 10 mm, preferably between 1 mm and 5 mm, more preferably between 2 mm and 4 mm, even more preferably said thickness is 3.5 mm.

According to an embodiment, the weight of the spacer fabric according to the present invention is between 200 $g/m^2$ and 600 $g/m^2$, preferably between 300 $g/m^2$ and 500 $g/m^2$, more preferably between 400 $g/m^2$ and 450 $g/m^2$, even more preferably said weight is 420 $g/m^2$.

According to an embodiment, the compression resistance of the spacer fabric according to the present invention is in the range between 2 and 30 kPa, preferably between 3 and 25 kPa.

According to an embodiment, the vapor transfer rate of the spacer fabric according to the present invention is greater than 1000 $g/m^2/24$ h according to ASTM E96.

According to the present invention, said fabric made of at least three superimposed layers can be used for manufacturing sports protections, sports clothes, healthcare and medical fabrics or for any other use that requires a fabric allowing breathability, lightweight, thin, flexibility, smooth surface, heat dissipation, and/or pressure redistribution or spreading over a much larger area of the product.

While various embodiments have been described and illustrated, the detailed description is not to be construed as being limited hereto. Various modifications can be made to the embodiments by those skilled in the art without departing from the true spirit and scope of the disclosure as defined by the claims.

Illustrative Embodiments of the Invention

Figure 9:
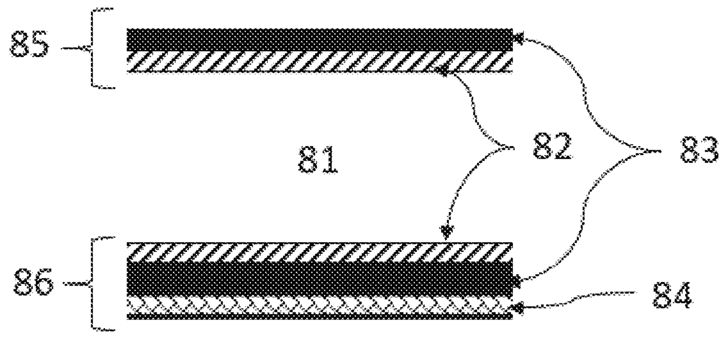
FIG. 9 is a part of cross section of an active part of a pressure application garment according to the present invention.

As shown in FIG. 9, an active part of a pressure application garment according to the present invention comprises various layers. The outer wall 85 and the inner wall 86 of the active part comprise a layer 82 impervious to the fluid 81 that fills the bladder and they can comprise a coating layer 83. The inner wall 86 of the active part further comprises at least one sheet of a fabric 84 made of at least three superimposed layers that comprises an upper layer in contact with the coating layer 83 (or in contact with the layer impervious to the fluid if there is no coating layer) and a lower layer that is in contact with the body of a subject.

As shown in FIGS. 1 to 5, the pressure application garment 1 of one embodiment comprises three active parts, i.e. one abdominal active part 3, intended to surround the abdomen A of a subject, and two lower active parts 4, 5, each of which is intended to surround one leg, or lower limb $L_1$, $L_2$, of the subject. Each of the active parts 3, 4, 5 of the pressure application garment 1 is a flexible textile part made of an airtight material. In particular, in this example, the airtight material of each active part 3, 4, 5 comprises a knitted nylon textile layer 82 coated, on one side, with a polyurethane coating layer 84; the coating layer that is on the side closest to the body part is coated with a fabric made of at least three superimposed layers 84. Said fabric made of at least three superimposed layers comprises an upper and a lower layers that comprise polyamide and that are separated by a yarn material comprising on the one hand, polyamide 6,6 fibres comprising silver ions and on the other hand, polyester-polyurethane copolymer yarns. The layer of the fabric made of at least three superimposed layers that is in contact with the coating layer 83 is the upper layer, whereas the lower layer of the fabric made of at least three superimposed layers 84 is in contact with the body part of a subject. In order to ease the placement of the pressure application garment 1 on the body of the subject, the two lower active parts 4, 5 are connected to the abdominal active part 3 by joining elements 9, which are in particular elastic textile strips. Each active part 3, 4, 5 can be deformed between a substantially planar deployed configuration, shown in FIG. 3, allowing for the placement thereof around the corresponding body part of the subject, and a tubular configuration, shown in FIG. 1, 2 or 5, wherein it is capable of surrounding the corresponding body part of the subject and of being adjusted around same.

Figure 4:
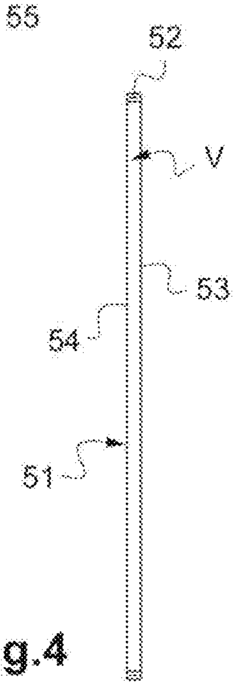
FIG. 4 is a sectional view at a larger scale along the plane IV-IV of FIG. 3.

As shown for the active part 5 in the sectional view of FIG. 4 (it being understood that the active parts 3 and 4 have similar sections to those of the active part 5), each active part 3, 4, 5 of the pressure application garment 1 comprises the superimposition of an inner textile portion 33, 43, 53, intended to be facing the body of the subject, and an outer textile portion 34, 44, 54, intended to be facing outwards, both of which being made of an airtight material as described above. For each active part 3, 4, 5, the inner textile portion 33, 43, 53 and the outer textile portion 34, 44, 54 made of an airtight material are connected together by a peripheral seam 32, 42, 52, which is also airtight. Thus, for each active part 3, 4, 5 of the pressure application garment 1, an airtight bladder 31, 41, 51 is delimited between the inner textile portion 33, 43, 53 and the outer textile portion 34, 44, 54, whereby the inner volume V of the bladder 31, 41, 51 is capable of being filled with air. The inner textile portion 33, 43, 53 and the outer textile portion 34, 44, 54 can also comprise a coating layer respectively on the side facing the body of the subject and on the side facing outwards. Moreover, the inner textile portion 33, 43, 53 comprises a fabric made of at least three superimposed layers on the side that is closest to the body of the subject.

In this example, each active part 3, 4, 5 comprises a single fillable bladder 31, 41, 51, which has the advantage of simplifying the design of the pressure application garment 1. However, alternatively, each active part 3, 4, 5 can comprise a plurality of fillable bladders. Each fillable bladder 31, 41, 51 of the pressure application garment 1 is intended to be filled with air such that, in the adjusted configuration of the active part 3, 4, 5 on the corresponding body part of the subject, the inner textile portion 33, 43, 53 applies a positive pressure thereto.

Each fillable bladder 31, 41, 51 of the pressure application garment 1 comprises a plurality of filling end pieces 36, 46, 56 distributed over the surface of the bladder in order to optimise the filling thereof. As diagrammatically shown in FIG. 5, the filling end pieces 36, 46, 56 of the active parts 3, 4, 5 are suitable for being connected to air injection devices 63, 64, 65. Different types of air injection devices can be used within the scope of the invention. In particular, each air injection device 63, 64, 65 can be a portable pump integrated into the garment 1, or a compressed air infeed in a hospital. Each fillable bladder 31, 41, 51 is equipped with at least one pressure gauge 60 for measuring the pressure to which the bladder is filled with air. Preferably, in order to measure the filling pressure in the different areas of each fillable bladder 31, 41, 51, a pressure gauge 60 is installed in each connection pipe between a filling end piece 36, 46, 56 of the bladder and the corresponding air injection device 63, 64, 65.

In order to control the pressure effectively applied to the abdomen A of the subject by the abdominal active part 3 and to the lower limbs $L_1$, $L_2$ of the subject by the lower active parts 4, 5, the garment 1 comprises interface pressure sensors 2 mounted on the inner textile portion 33, 43, 53 of each active part 3, 4, 5. Each sensor 2 is intended to measure a pressure at the interface between the active part 3, 4, 5 onto which it is attached and the corresponding body part of the subject. Each sensor 2 can, for example, be sewn into a compartment provided for this purpose in the corresponding inner textile portion 33, 43, 53. Alternatively, each sensor 2 can be rigidly secured to the corresponding inner textile portion 33, 43, 53 by any other appropriate means, in particular by sewing or bonding, etc.

In one example embodiment, each interface pressure sensor 2 can be a pneumatic sensor as disclosed in patent document WO2009072011A1, comprising a flexible polymer cushion capable of receiving, in the inner volume thereof, a predetermined volume of injected air corresponding to a known positive pressure, the cushion being connected in a sealed manner by means of a flexible tube (not shown) to a measurement module 72. The measurement module 72 of each sensor 2 in particular comprises a pressure gauge and an air injection piston, which are in fluid communication with one another and with the pneumatic sensor 2. The use of such pneumatic sensors avoids the need for electronic components on the active parts 3, 4, 5 of the pressure application garment 1, whereby the electronics are offset in the measurement module 72 external to the textile parts. These pneumatic sensors also have the advantage of being compatible with the relatively low interface pressure levels sought after in the case of LBPP, which in particular lie in the range 10 to 40 mmHg. It goes without saying that, alternatively, the pressure application garment 1 can comprise electronic interface pressure sensors, provided that the sensitivity of these electronic sensors is compatible with the interface pressure levels sought after.

For each active part 3, 4, 5, the number and arrangement of the interface pressure sensors 2 are suitable for providing pressure measurements representative of the pressure effectively applied to the body part of the subject. By way of a non-limiting example, in this embodiment, the abdominal active part 3 of the pressure application garment 1 comprises three interface pressure sensors 2, i.e. an anterior central sensor 2 intended to be positioned in front of the centre of the subject's abdomen, and two lateral sensors 2 intended to be positioned on the sides of the abdomen. Each lower active part 4, 5 of the pressure application garment 1 comprises five interface pressure sensors 2, i.e. one posterior lower sensor 2 intended to be positioned to the rear of the subject's calf, one medial lower sensor 2 intended to be positioned on the medial face of the calf, one posterior upper sensor 2 intended to be positioned on the posterior face of the subject's thigh, one medial upper sensor 2 intended to be positioned on the medial face of the thigh, and one anteromedial upper sensor 2 intended to be positioned on the anteromedial face of the thigh.

Figure 5:
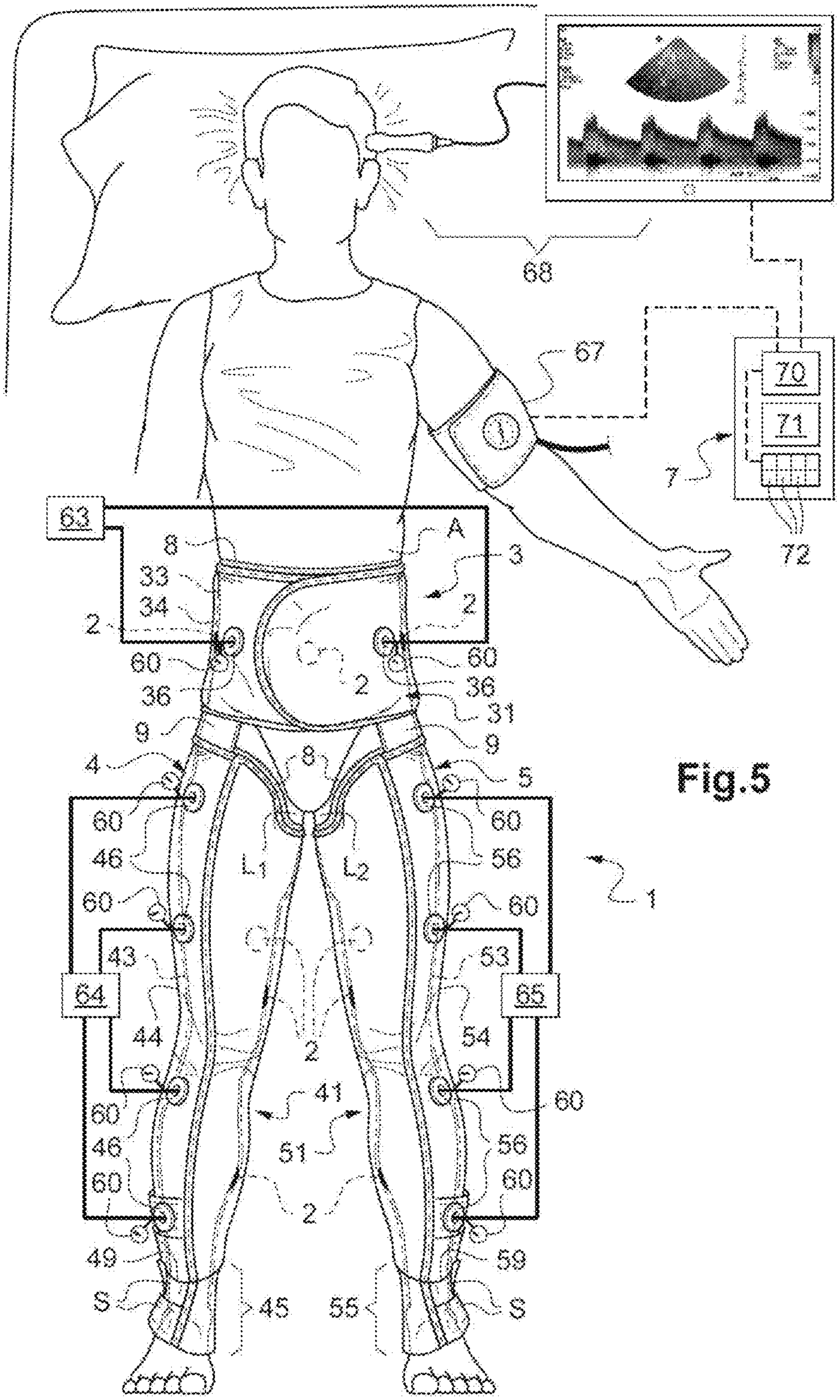
FIG. 5 is a front view of the pressure application garment of FIG. 1 placed on a subject and connected to air injection devices.

The pressure application garment 1 comprises a control unit 7, shown in FIG. 5, which can take on the form of a housing capable of being attached to the surface of a textile part of the pressure application garment 1, or to an element of furniture, such as a bed on which the pressure application session is carried out using the garment 1. In the case of interface pressure sensors 2 of the pneumatic type, the measurement module 72 associated with each pneumatic interface pressure sensor of the pressure application garment 1 is advantageously integrated into the housing of the control unit 7, which further comprises a receiving module 70 configured to receive the interface pressure measurements from the measurement module 72 of each pneumatic interface pressure sensor. The connection between each measurement module 72 and the receiving module 70 can thus be wired or wireless. In the case of interface pressure sensors 2 of the electronic type, each electronic interface pressure sensor is configured to transmit the interface pressure measurements directly to the receiving module 70 of the control unit 7, in particular by wireless connection means. The one or more filling pressure gauges 60 of each fillable bladder 31, 41, 51 are also connected to the receiving module 70 of the control unit 7. Thus, an automatic servo system can be produced between the filling pressure sensors 60 and the interface pressure sensors 2 of each active part 3, 4, 5.

As shown in FIG. 5, the receiving module 70 of the control unit 7 is also configured to receive:

- measurements representative of the subject's blood pressure during the treatment session obtained, in particular continuously, using a tensiometer 67 comprising a cuff positioned on an arm of the subject; in particular, measurements representative of the subject's blood pressure include the systolic blood pressure (SBP), the diastolic blood pressure (DBP), the mean arterial blood pressure;

measurements representative of the intracerebral blood flow of the subject during the treatment session obtained, in particular continuously, by transcranial Doppler using a device 68 comprising a probe positioned on the subject's head, typically a 2 MHz Doppler probe, associated with a computing unit; in particular, measurements representative of the intracerebral blood flow of the subject include the peak systolic velocity (PSV), the end-diastolic velocity (EDV), the resistive index, the area under the curve.

The control unit 7 further comprises a driving module 71, which is configured to drive the one or more air injection devices 63, 64, 65 as a function of:

the interface pressure measurements received by the receiving module 70 for each active part 3, 4, 5, so as to maintain a predefined interface pressure setpoint for said active part;

the measurements representative of the subject's blood pressure received by the receiving module 70, so as to keep the subject's blood pressure values below predefined thresholds, in particular so as to keep the systolic blood pressure (SBP) strictly below 220 and the diastolic blood pressure (DBP) strictly below 120:

the measurements representative of the intracerebral blood flow of the subject received by the receiving module 70, so as to correlate the change in the measurements representative of the intracerebral blood flow of the subject with the pressure gradient applied to the body parts of the subject by means of the pressure application garment and/or to associate the measurements representative of the intracerebral blood flow of the subject with a therapeutic goal, for example an average increase of 30% in intracerebral blood flow compared to that at the start of the treatment session, with the possibility of creating an alert when said therapeutic goal has been reached, whereby the practitioner decides whether or not to continue the session as a function of the functional results obtained.

The control unit 7 provides automatic control of the interface pressure, and servo-control of the air injection in the bladder 31, 41, 51 of each active part 3, 4, 5 as a function of the interface pressure measurements from the sensors 2 and of the predefined interface pressure setpoint for each active part. It is thus possible to apply, in an automated manner, a constant and controlled pressure to each body part of the subject throughout the duration of a pressure application session using the pressure application garment 1, without manual intervention.

In particular, according to one example, for the application of LBPP using the pressure application garment 1, the predefined interface pressure setpoint for the abdominal active part 3 is 10 mmHg, and the predefined interface pressure setpoint for each lower active part 4, 5 is 20 mmHg, whereby the garment 1 is advantageously configured so as to maintain the predefined interface pressure setpoint for each active part 3, 4, 5 for a duration of about 90 minutes.

In order to better take on the shape of each body part of the subject and to obtain the most effective and homogeneous application of pressure possible to each part of the body, each active part 3, 4, 5 of the pressure application garment 1 comprises adjustment means for adjusting the active part 3, 4, 5 around the corresponding body part of the subject. In the example shown in FIGS. 1 to 5, these adjustment means comprise a pair of gripping strips on each active part 3, 4, 5, allowing the active part to be closed in the adjusted configuration around the corresponding body part A, $L_1$, $L_2$ of the subject.

More specifically, in the example shown, each active part 3, 4, 5 comprises, over the entire length thereof in the axial direction in the tubular configuration, a first gripping strip 37, 47, 57 provided with hooks, which is situated on a first longitudinal end of the active part, on the side of the outer textile portion 34, 44, 54, and a second gripping strip 38, 48, 58 provided with loops, which is situated on the second longitudinal end of the active part, this time on the side of the inner textile portion 33, 43, 53. The gripping strips 37, 38, 47, 48, 57, 58 allow the circumference of the active part 3, 4, 5 to be adjusted around the corresponding body part A, $L_1$, $L_2$ of the subject in an adapted manner over the entire length of the active part.

Each of the two lower active parts 4, 5 further comprise, opposite the abdominal active part 3, a portion 45, 55 that can be rolled up, intended to adapt the length of the lower active part 4, 5 to the length of the lower limbs $L_1$, $L_2$ of the subject and thus to apply a positive pressure to the lower limbs $L_1$, $L_2$ in the most targeted manner possible. As shown in FIGS. 1 and 5, each roll-up portion 45, 55 is formed by a plurality of segments S configured to be folded back on top of one another. Preferably, in the state wherein the segments S are folded back on top of one another, the portion of the fillable bladder 41, 51 corresponding to the folded segments S cannot be filled with air.

Figure 3:
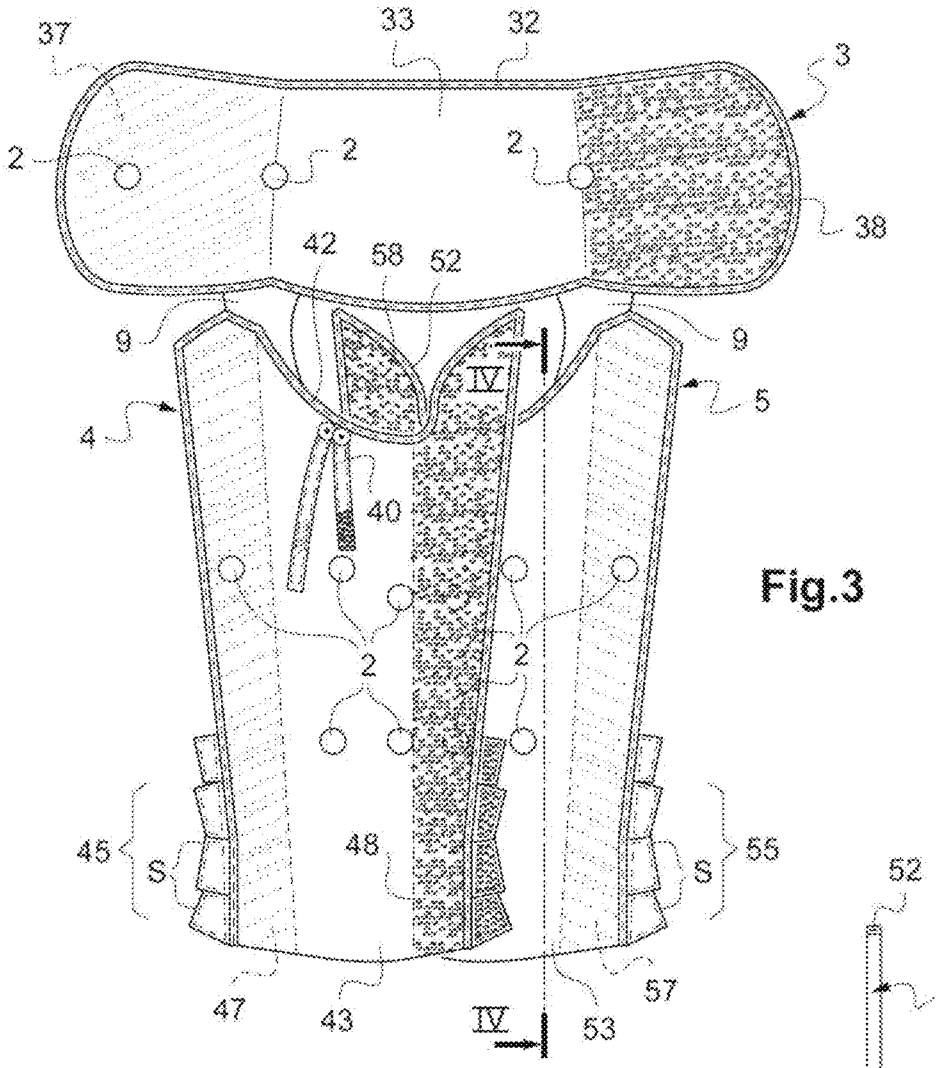
FIG. 3 is a front view of the pressure application garment of FIG. 1 with the active parts thereof in a deployed configuration.

As shown in FIG. 3, the lower active part 4 of the pressure application garment 1, which is intended to cover the right leg or the right lower limb $L_1$ of the subject, comprises an inner cuff 40 which, when the lower active part 4 is in place around the right lower limb $L_1$ of the subject, is capable of surrounding the subject's right thigh and of applying a tightening force thereto. The tightening cuff 40 can in particular be an inflatable cuff, comprising gripping strips in order to allow the cuff to be held in place around the subject's thigh, and intended to be filled with air at a standardised pressure of about 50 mmHg. The tightening cuff 40 is intended to allow the subject's mobilisable blood volume (or "venous bed") to be assessed before carrying out a pressure application session, in particular LBPP, using the pressure application garment 1.

The procedure for assessing the mobilisable blood volume can advantageously comprise the application of a vein occlusion on the subject's right thigh using the tightening cuff 40, and the measurement of the variations in the volume of the right lower limb as a result of this occlusion and the release thereof, in particular by air plethysmography, by measuring the variations in air pressure in the lower active part 4 forming an air-filled sleeve around the right lower limb $L_1$ of the subject.

Preferably, as shown in FIG. 5, when placed on a subject, the pressure application garment 1 comprises a disposable protective textile 8 between the body of the subject and each of the active parts 3, 4, 5. The protective textile 8, which is for example a microfibre textile having a weight per unit area that lies in the range 40 to 170 g/m$^2$, acts as a "second skin", preventing irritation of the subject's skin as a result of contact with the active parts 3, 4, 5. Advantageously, the protective textile 8 is applied in a removable manner on the inner textile portion 33, 43, 53 of each active part 3, 4, 5, while being held tensioned by any appropriate means, for example using gripping strips, so as to prevent the presence of folds that are likely to irritate the subject's skin. The protective textile further prevents fouling of the active parts 3, 4, 5 such that the pressure application garment 1 can be reused for different pressure application sessions without hygiene issues insofar as the protective textile 8 used during a session is removed at the end of the session and replaced with a new protective textile 8 for a later session.

One example of a method for applying pressure according to the “Lower Body Positive Pressure” (LBPP) principle, to the abdomen A and the lower limbs $L_1$, $L_2$ of a subject, using the pressure application garment 1 as described above, comprises steps as described below.

Firstly, the pressure application garment 1 is placed on the subject, preferably in a non-inflated state of the pressure application garment, i.e. a state in which each of the fillable bladders 31, 41, 51 of the garment is not filled with air or filled with very little air.

For this purpose, each active part 3, 4, 5 of the pressure application garment 1 is positioned in the deployed configuration thereof, as shown in FIG. 3, and the protective textile 8 is applied on the fabric made of at least three superimposed layers that coats the inner textile portion 33, 43, 53 of each active part 3, 4, 5. The abdominal active part 3 of the pressure application garment 1 is then placed at the level of the subject’s abdomen A, and the two lower active parts 4, 5 are each placed at the level of one lower limb $L_1$, $L_2$ of the subject. Each active part 3, 4, 5 is then closed, moving from the deployed configuration thereof into a tubular configuration around the corresponding body part of the subject, and is adjusted around the corresponding body part of the subject using gripping strips 37, 38, 47, 48, 57, 58.

In the case of a bedridden subject or a subject suffering from limb paralysis, the design of the pressure application garment 1 allows it to be placed on the subject in the laid-back position. In such a case, the pressure application garment 1 is positioned on a bed, with each of the active parts 3, 4, 5 thereof in the deployed configuration and provided with the protective textile 8, then the subject is laid on his/her back on top of the pressure application garment 1, while positioning the subject’s abdomen A at the level of the abdominal active part 3 and each of the subject’s lower limbs $L_1$, $L_2$ at the level of the corresponding lower active part 4, 5 of the pressure application garment. Each active part 3, 4, 5 is then closed by moving from the deployed configuration thereof into a tubular configuration around the corresponding body part of the subject lying down, and is adjusted around the corresponding body part of the subject using the gripping strips 37, 38, 47, 48, 57, 58, which have been provided at the front of the pressure application garment for this purpose.

Each bladder 31, 41, 51 of the pressure application garment 1 is then filled using air injection devices 63, 64, 65 connected to the filling end pieces 36, 46, 56 until a measurement is obtained for each active part 3, 4, 5 by each interface pressure sensor 2 of the active part that is substantially equal to the predefined interface pressure setpoint for said active part. In particular, according to one advantageous example of the application of LBPP using the pressure application garment 1, the predefined interface pressure setpoint for the abdominal active part 3 is 10 mmHg, and the predefined interface pressure setpoint for each lower active part 4, 5 is 20 mmHg. The control unit 7 of the pressure application garment 1 can be configured to fill the bladders 31, 41, 51 of the garment in an automatic manner.

The application of a constant and homogeneous pressure of 10 mmHg to the subject’s abdomen A and of 20 mmHg to each of the subject’s lower limbs $L_1$, $L_2$ for a determined duration, for example for a duration of 90 minutes, is then carried out automatically by the pressure application garment 1 thanks to the control unit 7 of the garment, which is configured to selectively actuate the air injection devices 63, 64, 65 as a function of the interface pressure measurements from the sensors 2 so as to maintain, for the determined duration, an interface pressure value measured by each sensor 2 that is equal to the predefined interface pressure setpoint for the active part 3, 4, 5 to which said sensor 2 is attached.

Figure 6:
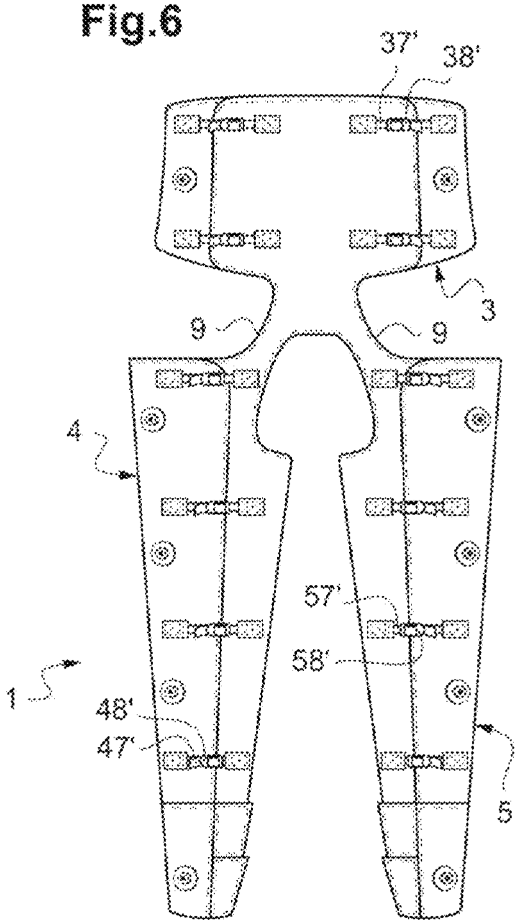
FIG. 6 is a view similar to that of FIG. 1 for a pressure application garment according to a second embodiment of the invention.

In the second embodiment shown in FIG. 6, similar elements to those of the first embodiment are denoted by the same references. The pressure application garment 1 of this second embodiment differs from that of the first embodiment in that the adjustment means of the active parts 3, 4, 5 on the body of a subject are formed by a plurality of closing systems using tightening straps 37', 47', 57' and corresponding clips 38', 48', 58', in place of the gripping strips 37, 38, 47, 48, 57, 58. As shown in FIG. 6, for each active part 3, 4, 5, the closing systems using tightening straps 37', 47', 57' and clips 38', 48', 58' are distributed over the entire length of the active part in the axial direction in the tubular configuration, so as to allow for the adjustment of the circumference of the active part 3, 4, 5 around the corresponding body part A, $L_1$, $L_2$ of the subject in an adapted manner over the entire length of the active part.

Figure 7:
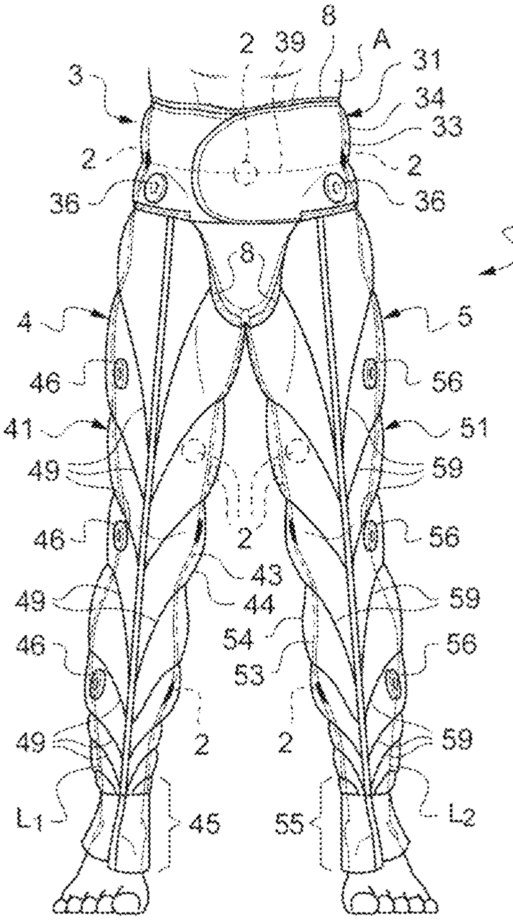
FIG. 7 is a view similar to that of FIG. 5 for a pressure application garment according to a third embodiment of the invention, from which the air injection devices have been omitted for better visibility.
Figure 8:
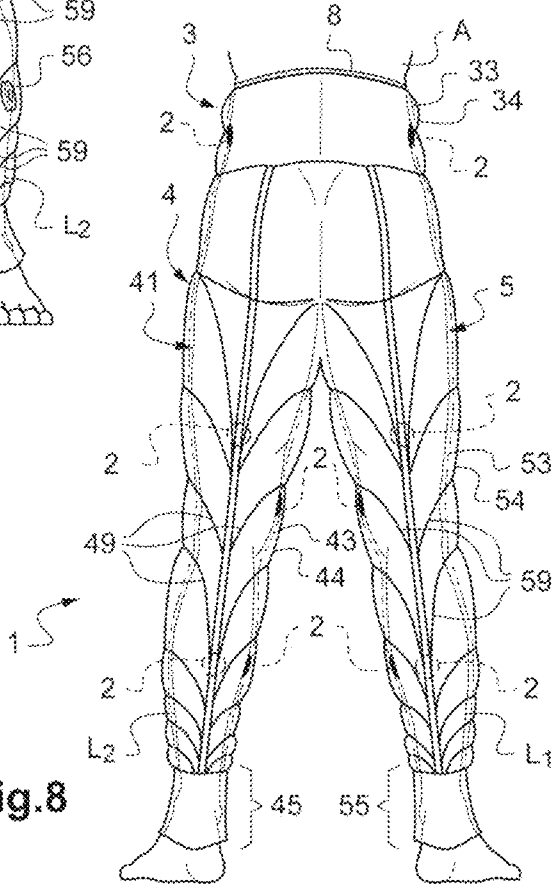
FIG. 8 is a rear view of the pressure application garment of FIG. 7.

In the third embodiment shown in FIGS. 7 and 8, similar elements to those of the first embodiment are denoted by the same references. The pressure application garment 1 of this third embodiment differs from that of the first embodiment in that the adjustment means of the active parts 3, 4, 5 on the body of a subject are not restricted to gripping strips 37, 38, 47, 48, 57, 58 that close longitudinally. In this third embodiment, the adjustment means further comprise sculptural seams 39, 49, 59 of the textile of each active part 3, 4, 5. The seams 39, 49, 59 of each active part 3, 4, 5 are configured to impose a shape of the active part 3, 4, 5 which applies the active part against the corresponding body part A, $L_1$, $L_2$ of the subject during the filling of the fillable bladder 31, 41, 51 of the active part with air. The seams 39, 49, 59 of each active part 3, 4, 5 allow the active part to better take on the shape of the corresponding body part of the subject. Moreover, as shown in FIG. 8, the pressure application garment 1 of this third embodiment encompasses the subject’s buttocks. The part covering the subject’s buttocks can be a fillable part, capable of being filled with air, and in particular can correspond to a fillable bladder, insofar as it can be useful to also apply a constant and controlled pressure to the subject’s buttocks in order to expel blood from this area. Alternatively, the part covering the subject’s buttocks can be non-fillable.

As shown in the previous examples, a pressure application garment according to the invention, comprising interface pressure sensors on the inner wall of each of the active parts thereof, allows homogeneous and constant pressures to be automatically applied to the abdomen and the lower limbs of a subject. In particular, the pressure application garment according to the invention is well-suited for the application of pressures according to the “Lower Body Positive Pressure” (LBPP) principle, involving differential pressures applied to the abdomen and lower limbs of a subject. Thanks to the airtightness and flexibility of the textile forming each of the active parts of the pressure application garment, each active part can act as an air chamber, while retaining a flexible structure, which procures high wearing comfort and eases the placement thereof on a subject, including a bedridden or paralysed subject. The possibility of providing the pressure application garment of the invention in different sizes, for example S, M, L, XL and the presence of adjustment means for adjusting the pressure application garment on each part of the body further allow the garment to adapt to the morphology of each subject, which contributes to the effectiveness of the garment for treatments by application of pressure, in particular according to the LBPP principle.

The invention is not limited to the examples described and illustrated. In particular, in the previous examples, each active part 3, 4, 5 of the pressure application garment comprises a single fillable bladder 31, 41, 51. Alternatively, the active parts of a garment according to the invention can each comprise any number of fillable bladders. Preferably, each fillable bladder of each active part is thus equipped with at least one interface pressure sensor. Moreover, the number and arrangement of the interface pressure sensors on each active part of a pressure application garment according to the invention can be different to those described in the previous examples. The interface pressure sensors used can also be of different sizes, adapted to suit the location thereof, and of different types, in particular pneumatic sensors, electronic sensors, or combinations of pneumatic and electronic sensors, etc. The airtight material, its coating layer, the fabric made of at least three superimposed layers and the protective textile can be of any type such as those described in the present description or equivalent. Finally, the pressure application garment according to the invention has been described above for the application of pressure corresponding to the "Lower Body Positive Pressure" (LBPP) principle. Alternatively, it can be used for the automatic application of all types of pressures to the abdomen and/or the lower limbs of a subject, for example pressures that vary over time, which can thus be automatically controlled by the control unit of the pressure application garment.

The application of the "Lower Body Positive Pressure" (LBPP) by means of a pressure application garment according to the invention comprises the following treatments, without limitation:

Improvement of Cerebral Vascular Recruitment in Different Clinical Situations

1—Acute phase of cerebral ischemia due to impairment of cerebral perfusion whatever the mechanism(s):

Ischemic stroke

Vasospasm.

2—Sub-acute phase of cerebral ischemia due to a persistent impairment of cerebral perfusion to improve functional recovery Ischemic stroke.

3—Chronic cerebral ischemia due to a chronic impairment of cerebral perfusion

In vascular dementia.

4—Improvement of ocular vascular recruitment in different clinical situations

Acute phase of carotid occlusion

Anterior ischemic optic neuropathy (AION)

Retinal artery occlusion

Chronic impairment of choroidal perfusion

Age related macular degeneration (AMD).

5—Use of LBPP to help or increase the delivery of a therapeutic agent for cerebral vascular deficiency selected from a group comprising anticoagulant agents, fibrinolytics, free radical-trapping agents, NO donors, in hypoperfused body zones.

6—Use of LBPP to help or increase the delivery of a therapeutic agent for ocular disorders selected from a group comprising antioxidants, anti-inflammatory agents, trophic factors, apoptosis inhibitors and statins, in hypoperfused body zones.

The invention claimed is:

1. A pressure application garment comprising at least one active part for applying pressure to at least one body part of a subject, comprising at least one bladder fillable with a fluid so as to obtain a homogeneous positive pressure applied to the whole of the corresponding at least one body part of the subject, said pressure application garment comprising:

for the at least one active part, at least one interface pressure sensor, and a control unit comprising a receiving module configured to receive the interface pressure measurements from the one or more interface pressure sensors of the at least one active part, and a driving module configured to drive, based on the interface pressure measurements received by the receiving module for the at least one active part, at least one injection device for injecting fluid into the one or more fillable bladders of the active part(s), so as to maintain a predefined interface pressure value for the at least one active part, wherein said pressure application garment comprises in at least one area of the inner wall of the at least one active part in contact with the body, at least one sheet of a fabric made of at least three superimposed layers comprising a lower layer that is closest to the body part, an upper layer and an intermediate layer, said intermediate layer being between the lower layer and the upper layer and having elasticity in the transverse direction, enabling at least a limitation of a deformation of the lower layer when the upper layer is deformed.

2. The pressure application garment according to claim 1, wherein said intermediate layer of said fabric made of at least three superimposed layers comprises elastic means, preferably said elastic means are in the form of a layer of springs and/or in the form of a mesh and/or in the form of a yarn material.

3. The pressure application garment according to claim 2, wherein said intermediate layer is in the form of a yarn material, said yarn material being in the form of yarns that are parallel to each other, that intertwine and that are perpendicular to the upper and lower layers.

4. The pressure application garment according to claim 2, wherein said intermediate layer is in the form of a yarn material, said yarn material being in the form of yarns that are wound on themselves parallel to the upper and lower layers.

5. The pressure application garment according to claim 1, wherein said upper and lower layers are made of natural or synthetic material.

6. The pressure application garment according to claim 1, wherein said intermediate layer comprises yarn material, said yarn material comprising polyamide-6,6 fibers.

7. The pressure application garment according to claim 6, wherein the intermediate layer further comprises elastomeric yarns.

8. The pressure application garment according to claim 1, wherein said fabric made of at least three superimposed layers has a thickness between 0.5 mm and 25 mm.

9. The pressure application garment according to claim 1, wherein said upper layer of said fabric made of at least three superimposed layers has a thickness between 0.1 mm and 5 mm.

10. The pressure application garment according to claim 1, wherein said lower layer of said fabric made of at least three superimposed layers has a thickness between 0.1 mm and 5 mm.

11. The pressure application garment according to claim 1, wherein said fabric made of at least three superimposed layers has a weight between 200 $g/m^2$ and 600 $g/m^2$.

12. The pressure application garment according to claim 1, wherein said intermediate layer of said fabric made of at least three superimposed layers has elasticity also in the longitudinal direction and/or in the lateral direction.

13. The pressure application garment according to claim 1, wherein, for each fillable bladder, the volume for receiving fluid is delimited by a flexible layer that is impervious to said fluid.

14. The pressure application garment according to claim 1, comprising a protective textile, capable of being replaced upon each use of the pressure application garment, which is secured in a removable manner to the wall of one or of each active part intended to be facing the body part of the subject.

15. The pressure application garment according to claim 1, wherein it comprises three active parts which are one abdominal active part intended to surround the subject's abdomen and two lower active parts each intended to surround one of the subject's lower limbs, each of the active parts comprising at least one bladder fillable with a fluid so as to obtain a homogeneous positive pressure applied by the active part to the whole of the corresponding body part of the subject among the abdomen and the lower limbs, wherein the at least one interface pressure sensor for each active part is configured to measure a pressure at the interface between the active part and the corresponding body part of the subject while being positioned between the active part and the corresponding body part of the subject, and wherein the predefined interface pressure value for the abdominal active part is strictly less than the predefined interface pressure value for each lower active part.

* * * * *